UNITED STATES PATENT OFFICE.

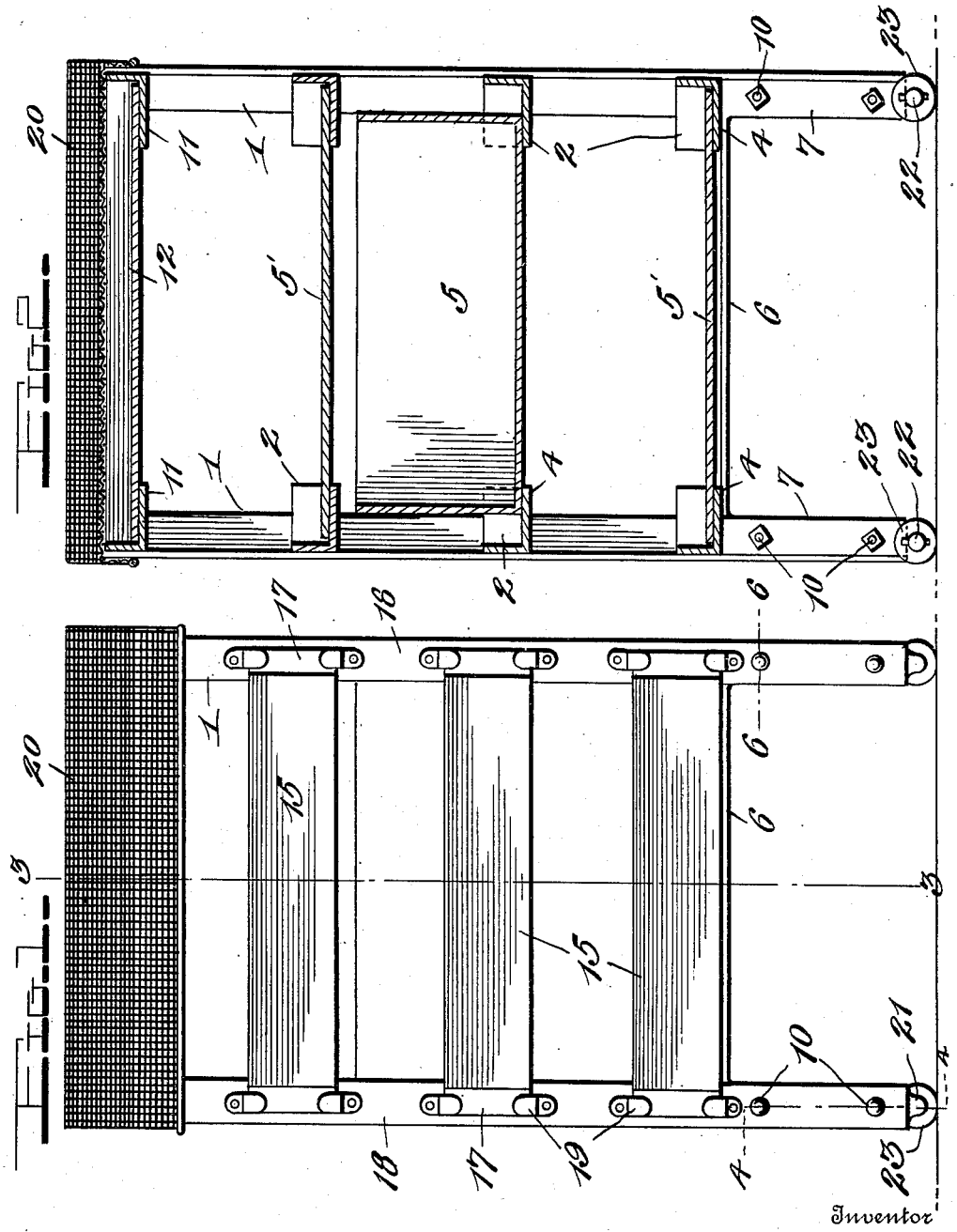

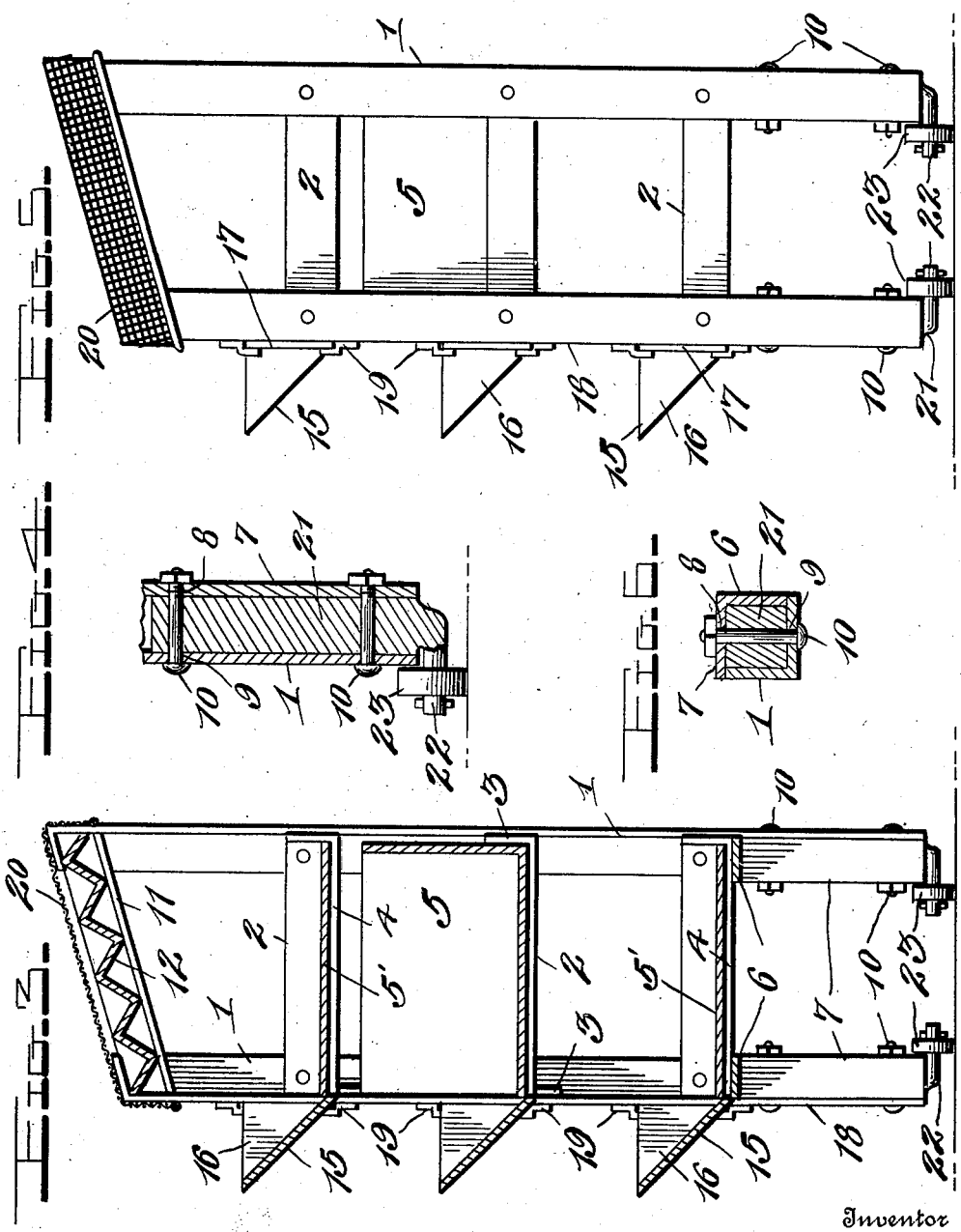

ANDREW H. RIEDERER, OF ROZEL, KANSAS.

DISPLAY-RACK.

1,026,771. Specification of Letters Patent. Patented May 21, 1912.

Application filed September 20, 1911. Serial No. 650,359.

*To all whom it may concern:*

Be it known that I, ANDREW H. RIEDERER, a citizen of the United States, residing at Rozel, in the county of Pawnee and State of Kansas, have invented certain new and useful Improvements in Display-Racks, of which the following is a specification, reference being had to the accompanying drawings.

This invention relates to fruit and vegetable display racks, and has for its object to produce a rack of this character constructed entirely of metal so that the same may withstand all climatic conditions.

A further object of the invention is to so construct a device of the character that the fruit and vegetables may be racked and displayed in the original containers, and at the same time permitting access thereto by the salesman.

With these and other objects in view, the invention consists of the novel features of construction, combination and arrangement of parts herein more fully described and claimed and illustrated in the accompanying drawings, in which—

Figure 1 is a front elevation of the rack; Fig. 2 is a longitudinal sectional view; Fig. 3 is a vertical sectional view on the line 3—3 of Fig. 1; Fig. 4 is a sectional view on the line 4—4 of Fig. 1; Fig. 5 is a side elevation of the rack; Fig. 6 is a sectional view on the line 6—6 of Fig. 1.

In constructing the rack a pair of supports 1 are provided, each of which is formed from angle iron. The rear support 1 is greater in height than the front support, the purpose of which will be hereinafter described. The supports 1 are held in spaced parallel relation by a series of angle iron spacing guides 2, the end webs 3 of which are so bent that the opposite ends of each guide may be riveted or otherwise suitably secured to the opposing faces of the supports 1. The bottoms 4 of opposite guides 2 are arranged on the same plane so that box or container 5 may be supported thereby, or if desired shelves 5' may be employed, whereby small boxes of fruit may be displayed. The supports are each connected near their lower ends by iron braces 6. It will be noted also that beneath the braces 6 the supports 1 are provided with terminal reinforcements 7 which have their webs resting against the inner edges of certain of the webs forming the supports 1, as clearly shown in Fig. 4 of the drawings. The braces 7 are provided with openings 8, said openings being adapted to register with openings 9 formed in the lower ends of the supports 1, and through which is passed bolts 10, whereby the braces are firmly clamped to the supports.

Connecting the upper ends of the supports 1 are a pair of inclined angle iron bars 11 upon which rest the opposite ends of a trough section 12, the purpose of which will be hereinafter described.

The fruit or vegetables in boxes or crates 5 are supported upon the bottoms 4 of the angle iron guides 2, the supports 1 being spaced a distance to correspond to the width of a container, so that the same when being placed in its proper position will have a limited inward travel. It will be, of course, understood that a container is supported upon each pair of guides. After the containers have been placed in their proper positions upon the guides 2, one side of each container is removed, the fruit or vegetables being prevented from falling by retaining plates 15, said plates being arranged at an inclination and having their opposite ends 16 bent at right angles, the extreme edges of the ends of the same being provided with flanges 17.

Pivotally connected to each leg 18 of the front support 1 are a pair of spaced keepers 19, said keepers being adapted to swing over and frictionally engage the flanges 17 of the container to firmly hold the same in place with reference to the support, so that the fruit or vegetables of the container will be safely effectually displayed.

A wire mesh hood 20 is provided and may be placed and supported in any suitable manner above the trough section 12.

By forming the rear support 1 greater in height than the front support the angle iron bars 11 are secured in an inclined position, so that the trough section 12 will be arranged in step by step relation, to display articles contained therein to a better advantage.

From this construction it will be seen that the rack is formed entirely from angle iron, which naturally strengthens the construction, as is obvious. The construction further permits the ready removal of an empty box or container upon manipulation of keepers 19 whereupon the retaining plates may be removed, and replaced upon the containers being again placed in their proper position.

It is apparent that a pair of racks constructed in accordance with the present invention may be arranged side by side one for racking and displaying vegetables and the other for fruit, or if desired fruit and vegetables may be displayed upon a single section.

Within the confines of the braces 7 and the lower ends of each support are bolted or otherwise suitably secured blocks 21, said blocks being provided with pintles 22, upon which are mounted rollers 23 so that the rack may be moved from place to place, whenever it is desired.

Having thus described the invention, I claim:

1. In a display rack, a frame comprising vertical supporting members and horizontal spacing members of angle iron of L cross section with their concave faces inwardly disposed to constitute of their webs shelf guiding and confining means, and retaining plates having their ends angularly offset and provided with flanges removably secured in front of the vertical members in an inclined plane intersecting the plane of the horizontal shelf guiding members.

2. In a display rack, a frame comprising vertical supporting members and horizontal spacing members of angle iron of L cross section with their concave faces inwardly disposed to constitute of their webs shelf guiding and confining members, retaining plates having their ends angularly offset and provided with flanges, and keepers pivotally mounted on the front vertical members and taking over the flanges to removably secure the retaining plates in front of the end vertical members in an inclined plane intersecting the plane of the horizontal shelf guiding members.

In testimony whereof I hereunto affix my signature in the presence of two witnesses.

ANDREW H. RIEDERER.

Witnesses:
E. W. FROMONG,
C. N. YOUNGDOFF.

Copies of this patent may be obtained for five cents each, by addressing the "Commissioner of Patents, Washington, D. C."